(12) United States Patent
Kapoor et al.

(10) Patent No.: US 10,846,350 B2
(45) Date of Patent: Nov. 24, 2020

(54) SYSTEMS AND METHODS FOR PROVIDING SERVICE DIRECTORY PREDICTIVE SEARCH RECOMMENDATIONS

(71) Applicant: Facebook, Inc., Menlo Park, CA (US)

(72) Inventors: Komal Kapoor, Bellevue, WA (US); Apaorn Tanglertsampan, Seattle, WA (US); Bradley Ray Green, Snohomish, WA (US); Meiying Li, Bellevue, WA (US); James Donovan, San Francisco, CA (US); Hannah Marie Hemmaplardh, Seattle, WA (US)

(73) Assignee: Facebook, Inc., Menlo Park, CA (US)

( * ) Notice: Subject to any disclaimer, the term of this patent is extended or adjusted under 35 U.S.C. 154(b) by 615 days.

(21) Appl. No.: 15/297,024

(22) Filed: Oct. 18, 2016

(65) Prior Publication Data
US 2018/0107742 A1  Apr. 19, 2018

(51) Int. Cl.
*G06F 16/9535* (2019.01)
*G06Q 50/00* (2012.01)
*G06F 16/248* (2019.01)
*G06F 16/2457* (2019.01)
*G06N 20/00* (2019.01)

(52) U.S. Cl.
CPC ........ *G06F 16/9535* (2019.01); *G06F 16/248* (2019.01); *G06F 16/24578* (2019.01); *G06Q 50/01* (2013.01); *G06N 20/00* (2019.01)

(58) Field of Classification Search
CPC .............. G06F 16/9535; G06F 16/248; G06F 16/3344; G06F 16/3329; G06F 16/3322; G06F 16/24575; G06F 16/29; G06F 17/2765

USPC ............ 707/727, 708, 709, 721, 728, 730, 707/999.003
See application file for complete search history.

(56) References Cited

U.S. PATENT DOCUMENTS

| | | | |
|---|---|---|---|
| 2009/0281988 A1* | 11/2009 | Yoo | G06Q 10/10 |
| 2014/0108383 A1* | 4/2014 | Chan | G06Q 50/01 |
| | | | 707/722 |
| 2014/0229164 A1* | 8/2014 | Martens | G06F 17/241 |
| | | | 704/9 |
| 2014/0244361 A1* | 8/2014 | Zhang | G06Q 30/0204 |
| | | | 705/7.33 |
| 2015/0363499 A1* | 12/2015 | Cheng | G06F 16/9535 |
| | | | 707/722 |
| 2016/0328661 A1* | 11/2016 | Reese | G06F 16/29 |
| 2016/0360382 A1* | 12/2016 | Gross | G06F 3/0488 |

* cited by examiner

Primary Examiner — Dung K Chau
(74) Attorney, Agent, or Firm — Sheppard Mullin Richter & Hampton LLP

(57) ABSTRACT

Systems, methods, and non-transitory computer-readable media can train a machine learning model to determine predictive search recommendation based on search prediction information. Search prediction information associated with a user is provided to the machine learning model. A predictive search recommendation is presented to the user based on the machine learning model and the search prediction information. A search is performed based on the predictive search recommendation for one or more search results associated with entity pages on a social networking system.

20 Claims, 8 Drawing Sheets

500

Train a machine learning model to determine predictive search recommendations based on search prediction information, wherein the search prediction information includes at least one of: user identification information, user social network information, user social network engagement information, or past search history information
502

Provide search prediction information associated with a user to the machine learning model
504

Present a predictive search recommendation to the user based on the machine learning model and the search prediction information
506

Perform a search based on the predictive search recommendation for one or more search results associated with entity pages on a social networking system
508

Present the one or more search results to the user based on the search, each search result being associated with an entity page on the social networking system
510

FIGURE 5

SYSTEMS AND METHODS FOR PROVIDING SERVICE DIRECTORY PREDICTIVE SEARCH RECOMMENDATIONS

FIELD OF THE INVENTION

The present technology relates to the field of social networking systems. More particularly, the present technology relates to systems and methods for providing predictive search recommendations in a service directory.

BACKGROUND

Today, people often utilize computing devices (or systems) for a wide variety of purposes. Users can use their computing devices, for example, to interact with one another, create content, share content, and view content. In some cases, a user can utilize his or her computing device to access a social networking system (or service). The user can provide, post, share, and access various content items, such as status updates, images, videos, articles, and links, via the social networking system.

A social networking system can include one or more pages associated with entities on the social networking system. For example, the social networking system can include one or more pages associated with merchants and/or service providers looking for exposure with consumers. In certain contexts, individual users can be distinguished from entity users on the social networking system. For example, an entity user or an entity account can be associated with a particular entity, and can be controlled by one or more administrators of the entity account, whereas an individual user can be associated with a particular individual. Both individual users and entity users can interact with one another on the social networking system by, for example, sending messages to one another, posting content to other users' accounts, sharing content publicly for publication to other users' newsfeeds, and the like. Interactions between users on a social networking system can be mutually beneficial. Participation in the social networking system by users can be encouraged and promoted by improving tools and features to facilitate interaction on the social networking system.

SUMMARY

Various embodiments of the present disclosure can include systems, methods, and non-transitory computer readable media configured to train a machine learning model to determine predictive search recommendations based on search prediction information. Search prediction information associated with a user is provided to the machine learning model. A predictive search recommendation is presented to the user based on the machine learning model and the search prediction information. A search is performed based on the predictive search recommendation for one or more search results associated with entity pages on a social networking system.

In an embodiment, the search prediction information includes at least one of: user identification information, user social network information, user social network engagement information, or past search history information.

In an embodiment, the one or more search results are presented to the user, each search result being associated with an entity page on the social networking system.

In an embodiment, it is determined that the user is logged into the social networking system.

In an embodiment, search prediction information is provided to the machine learning model and the predictive search recommendation is presented to the user in response to the determination that the user is logged into the social networking system.

In an embodiment, the one or more search results are ranked based on ranking criteria. The search results are presented to the user based on the ranking, and the ranking criteria are based on a popularity of each entity page associated with each search result.

In an embodiment, the ranking criteria are further based on interactions between connections of the user on the social networking system with one or more entity pages associated with one or more search results.

In an embodiment, the predictive search recommendation is associated with a service category defined by the social networking system.

In an embodiment, one or more related service categories associated with the service category are presented to the user.

In an embodiment, a selection of a first related service category of the one or more related service categories is received. A second search is performed based on the first related service category.

It should be appreciated that many other features, applications, embodiments, and/or variations of the disclosed technology will be apparent from the accompanying drawings and from the following detailed description. Additional and/or alternative implementations of the structures, systems, non-transitory computer readable media, and methods described herein can be employed without departing from the principles of the disclosed technology.

BRIEF DESCRIPTION OF THE DRAWINGS

FIG. 5 illustrates an example method associated with providing a predictive search recommendation, according to an embodiment of the present disclosure.

Figure 1:
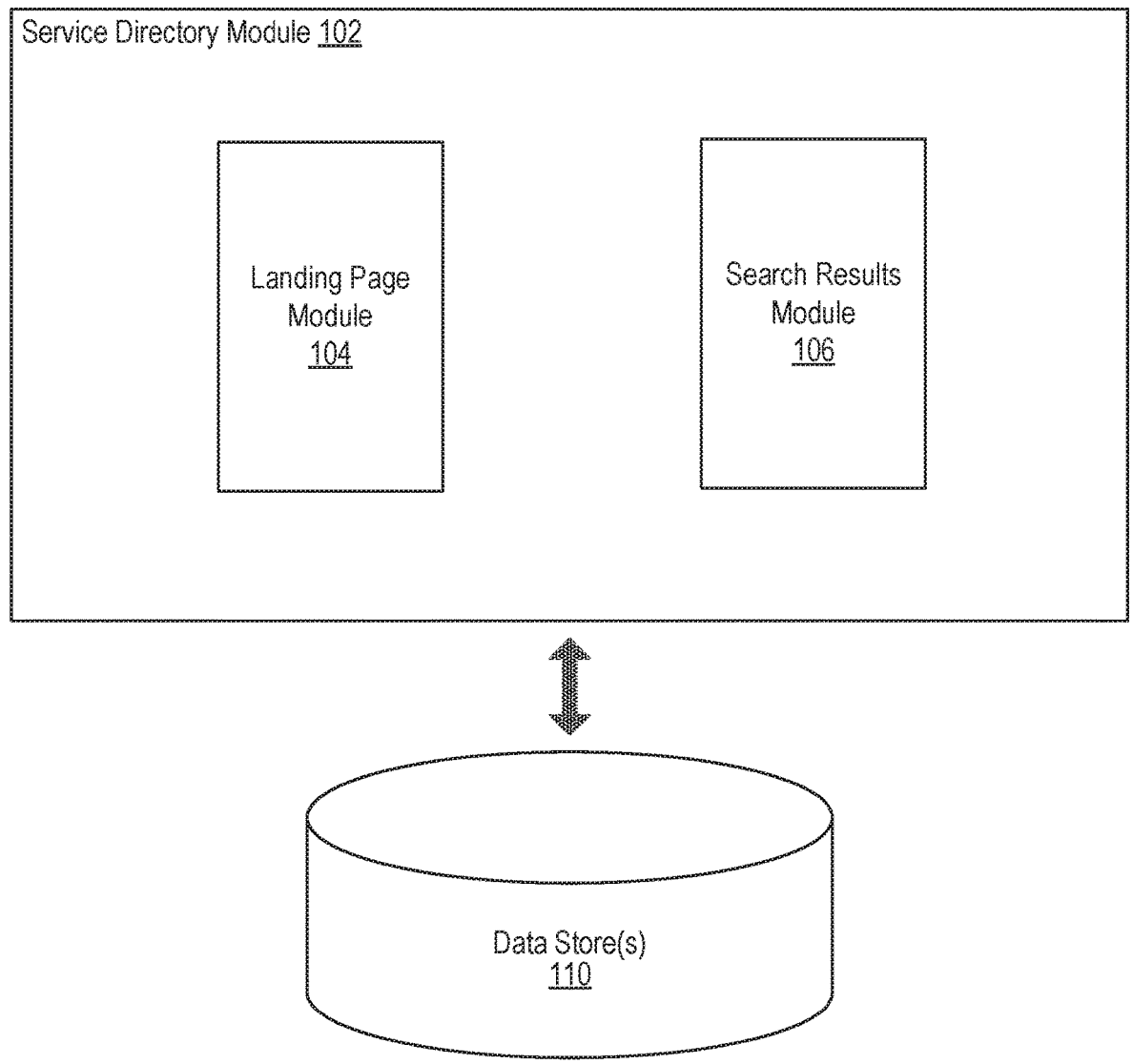
FIG. 1 illustrates an example system including a service directory module, according to an embodiment of the present disclosure.

The figures depict various embodiments of the disclosed technology for purposes of illustration only, wherein the figures use like reference numerals to identify like elements. One skilled in the art will readily recognize from the following discussion that alternative embodiments of the structures and methods illustrated in the figures can be employed without departing from the principles of the disclosed technology described herein.

DETAILED DESCRIPTION

Service Directory Predictive Search Recommendations

People often utilize computing devices (or systems) for a wide variety of purposes. Users can use their computing devices to, for example, interact with one another, access content, share content, and create content. In some cases, content items can include postings from users of a social networking system. The postings may include text and media content items, such as images, videos, and audio. The postings may be published to the social network for consumption by others.

A social networking system can include one or more pages associated with entities on the social networking system. For example, the social networking system can include one or more pages associated with merchants and/or service providers looking for exposure with consumers. In certain contexts, individual users can be distinguished from entity users on the social networking system. For example, an entity user or an entity account can be associated with a particular entity, and can be controlled by one or more administrators of the entity account, whereas an individual user can be associated with a particular individual. Both individual users and entity users can interact with one another on the social networking system by, for example, sending messages to one another, posting content to other users' accounts, sharing content publicly for publication to other users' newsfeeds, and the like. Interactions between users on a social networking system can be mutually beneficial. Participation in the social networking system by users can be encouraged and promoted by improving tools and features to facilitate interaction on the social networking system.

Under conventional approaches, entity pages on a social networking system can help merchants and/or service providers provide information about their businesses or services to other users on the social networking system. Entity pages can also allow entities to interact with individual users and potential customers on the social networking system. However, without knowing a particular entity's name, or searching for a specific entity, it can be difficult for individual users to discover new merchants and/or service providers under conventional approaches. Furthermore, it may be even more difficult, or impossible, for consumers that are not users (or members) of the social networking system to discover the entities' pages on the social networking system. Accordingly, such conventional approaches can engender these and other problems arising in computer technology.

An improved approach rooted in computer technology overcomes the foregoing and other disadvantages associated with conventional approaches specifically arising in the realm of computer technology. In general, a service directory can be provided on a social networking system that allows users to search for entity pages on the social networking system. In various embodiments, users may utilize the service directory regardless of whether or not the user is a user or member of the social networking system. The service directory can provide a search function for users to search for entities (e.g., service providers) on the social networking system. In certain embodiments, a computing system can be configured to train a model for predicting a service category that may be of interest to a particular user. The service category predicted by the model can be provided to the user as a predictive search recommendation. For example, when the particular user enters a landing page for the service directory, a search bar may be pre-filled with a search recommendation for that particular user based on the model. The model can be trained using, for example, demographic information, user social network engagement information, previous search information, and the like. Once the user runs a search, the user can be presented with a list of search results that include one or more entity pages on the social networking system that match the search.

While the examples used herein may describe a service directory in which a user can search for service categories and/or service providers on a social networking system, the approaches described herein can be adapted to searches for any entity having an entity page on the social networking system. As such, the approaches described herein need not be limited to searches for service providers on a social networking system.

FIG. 1 illustrates an example system 100 including an example service directory module 102, according to an embodiment of the present disclosure. The service directory module 102 can be configured to provide a service directory for assisting a user in finding entity pages on a social networking system. For example, the service directory can include a search function for a user to search for a particular entity page or to search for a service category. A model can be trained to recommend a service category for a user to search. For example, the user may be presented with a search recommendation for a service category that the model has predicted may be relevant to the user. The search recommendation can be tailored to a particular user. The user can choose to run a search based on the search recommendation, or the user can enter their own search terms. When the user runs a search, the user can be presented with search results including a list of entity pages that are relevant to the search. For example, if the user runs a search for a particular service category, the user can be presented with search results including entity pages that are relevant to the service category. For instance, if a user searches for "plumbing," the user can be presented with a list of plumbers' entity pages on the social networking system. In certain embodiments, the search may also include a location field to specify a particular location. In this way, search results can be limited to entities that are located near the specified location and/or service the specified location.

As shown in the example of FIG. 1, the service directory module 102 can include a landing page module 104 and a search results module 106. In some instances, the example system 100 can include at least one data store 110. The components (e.g., modules, elements, etc.) shown in this figure and all figures herein are exemplary only, and other implementations may include additional, fewer, integrated, or different components. Some components may not be shown so as not to obscure relevant details. In various embodiments, one or more of the functionalities described in connection with the service directory module 102 can be implemented in any suitable combinations.

In some embodiments, the service directory module 102 can be implemented, in part or in whole, as software, hardware, or any combination thereof. In general, a module, as discussed herein, can be associated with software, hardware, or any combination thereof. In some implementations, one or more functions, tasks, and/or operations of modules can be carried out or performed by software routines, software processes, hardware, and/or any combination thereof. In some cases, the service directory module 102 can be implemented, in part or in whole, as software running on one or more computing devices or systems, such as on a user or client computing device. For example, the service directory module 102, or at least a portion thereof, can be implemented as or within an application (e.g., app), a program, or an applet, etc., running on a user computing device or a client computing system, such as the user device 610 of FIG. 6. In another example, the service directory module 102, or at least a portion thereof, can be implemented using one or more computing devices or systems that include one or more servers, such as network servers or cloud servers. In some instances, the service directory module 102 can, in part or in whole, be implemented within or configured to operate in conjunction with a social networking system (or service), such as the social networking system 630 of FIG. 6. It should be understood that there can be many variations or other possibilities.

The service directory module 102 can be configured to communicate and/or operate with the at least one data store 110, as shown in the example system 100. The data store 110 can be configured to store and maintain various types of data. In some implementations, the data store 110 can store information associated with the social networking system (e.g., the social networking system 630 of FIG. 6). The information associated with the social networking system can include data about users, user identifiers, social connections, social interactions, profile information, demographic information, locations, geo-fenced areas, maps, places, events, pages, groups, posts, communications, content, feeds, account settings, privacy settings, a social graph, and various other types of data. In some embodiments, the data store 110 can store information that is utilized by the service directory module 102. For example, the data store 110 can store entity page information, service category groupings, historical service directory search information, and the like. It is contemplated that there can be many variations or other possibilities.

The landing page module 104 can be configured to provide a service directory landing page. The landing page can be configured to allow a user to search for and/or select a service category from various service category options so that the user can find an entity associated with a particular service category. In certain embodiments, the landing page module 104 can provide a search function for a user to search for entity pages on a social networking system. For example, the user can search for a particular entity by name, and a list of one or more entity pages matching the search can be presented to the user. If the user is not looking for a particular entity, but is looking for any entities associated with a particular service category, the user can search for a service category. For example, if the user needs a plumber, but does not have a particular plumber in mind or is not aware of one, the user can enter the search term "plumber" or "plumbing." In this case, the user can be presented with a list of one or more entities that match the service category. In certain embodiments, the search may also include a location field to specify a particular location. In this way, search results can be limited to entities that are located near the specified location and/or service the specified location. In various embodiments, the landing page module 104 can be configured to provide a predictive search recommendation for a user. A model can be trained to predict a service category that may be relevant to a particular user based on training data. The model can then be provided with search prediction information that allows the model to make a prediction of a service category that may be of interest to the user, and the predictive service category can be presented to the user as a search recommendation.

In addition to providing a search function, the landing page module 104 can also be configured to provide one or more service category options for selection by a user. For example, the user can be provided with a list of service categories. Service categories can be presented as, for example, selectable icons or selectable text. When a user selects a particular service category, a search can be run based on the selected service category so as to provide the user with a list of entity pages associated with the selected service category.

In certain embodiments, the landing page can be available publicly, such that users can access the landing page regardless of whether or not they are signed into or members of a social networking system. In some embodiments, the landing page experience is identical for logged-in or logged-out users. Alternatively, in certain embodiments, user experience may be different for logged-in or logged-out users. For example, if a user is logged-in to a social networking system, the landing page may be tailored to the particular user. For example, various fields may be pre-filled (e.g., the location field in the search function), or other aspects may be customized to the particular user (e.g., the listing of service categories may be tailored to the particular user). In certain embodiments, a predictive search recommendation may be provided if the user is logged into a social networking system. If a user is not logged-in to a social networking system, certain user-specific information may not be available to support certain types of individual tailoring to the particular user. As such, in various embodiments, a predictive search recommendation or a location prediction may be provided to the user in response to a determination that the user is logged into the social networking system. However, in various embodiments, even if a user is not logged into a social networking system, other available user information may be used to provide user-specific tailoring, such as a predictive search recommendation or a location prediction. More details regarding the landing page module 104 will be provided with reference to FIG. 2.

The search results module 106 can be configured to run a search and provide search results to a user. As mentioned, a search may be run based on various search criteria, such as user entered search terms (e.g., a service category, location information, an entity name, etc.), a search recommendation provided to the user, or selection of a service category option by a user.

Search results can include a search results list having entries corresponding to entity pages on a social networking system that match the search criteria. Each search result can lead users to an entity page associated with the search result. For example, if a user clicks on a search result, the user may be directed to the entity page associated with the search result. Each search result can include information about each entity, such as the entity's name, a description of the entity, address, phone number, service categories associated with the entity, etc. Each entry can also include social context information for each entity. For example, social context information can include a rating and/or reviews for the entity (e.g., reviews posted to the social networking system by other users of the social networking system, or reviews posted to other sites), the number of users on the social networking system that have liked or followed the entity page, the number of users that have visited the entity page, and the like. Each entry in the search results list can also include one or more call to action buttons or icons. A call to action button can be selected by a user to take a particular action with respect to the entity and/or the entity page. For example, the user can select a "Like" call to action button to like a particular entity's page, or can select a "Message" call to action button to send a message to an entity's page. Certain call to action buttons can be presented by default for each entity page (e.g., a "Like" or "Message" button), while other call to action buttons can be specifically selected by an entity page. For example, certain entity pages may offer online appointment scheduling services, and can offer a "Book Now" call to action button that directs the user to the online appointment scheduling service.

The search results module 106 can be configured to rank the search results based on various ranking criteria. Ranking criteria can include, for example, the relevance of a particular entity page to the search terms (e.g., a service category and/or a location), social context information (e.g., the number of users who have liked, followed, and/or visited an entity page), the quality of an entity page's reviews, etc. In certain embodiments, ranking criteria may include user-specific characteristics, such that rankings may be tailored and/or unique to individual users. For example, if a particular user's connections on a social networking system have positively reviewed a particular entity, or if the user's connections have liked or followed the entity's page, that entity may be ranked higher than other entities that have not been reviewed, liked, and/or followed by the user's connections on the social networking system. It should be appreciated that such user-specific information may only be available if the user is logged into a social networking system. As such, ranking criteria may differ based on whether or not the user is logged into the social networking system. If a user is not logged into a social networking system, a first set of ranking criteria may be used, and if the user is logged into the social networking system, a second set of ranking criteria may be used, and the second set of ranking criteria may include user social network information. For example, if a user runs a search and the user is not logged into a social networking system, search results may be ranked based on entity-specific information, such as each entity page's relevance to the search criteria, the popularity of the entity page associated with each search result (e.g., the number of followers of the entity page), and/or the quality of reviews and/or ratings received by each entity page. If the user is logged into a social networking system, search results can be ranked using the same entity-specific information, or search results can also include user-specific information, such as whether or not the user's connections on the social networking system have followed or liked an entity page, or positively or negatively reviewed an entity page.

The search results module 106 can be configured to provide a map identifying locations associated with the one or more entity pages provided in the search results. For example, the map can include one or more pins, each pin associated with a particular entity page listed in the search results. The map may be interactive. For example, if the user hovers over a particular search result, a pin associated with the particular search result may be highlighted on the map. In another example, if the user hovers over a pin on the map, or selects the pin on the map, entity information can be presented for the search result or entity page associated with the pin.

The search results module 106 can also be configured to provide one or more related search criteria. For example, the search results module 106 can provide a list of service categories that are related to or similar to the service category searched by the user. If the user selects one of the related service categories, another search can be run based on the related service category selected by the user. In certain embodiments, related service categories can be determined based on groupings of categories. For example, the service directory can include tiered levels of categories, each level defining categories with greater specificity. For example, a first or highest tier of categories can be somewhat broad, e.g., automotive, home improvement, spa/beauty/personal care, etc. Each category in this highest level of categories can then include one or more sub-categories. For example, the "automotive" category can include the categories "repair," "car dealership," "car wash," etc.; the "home improvement" category can include the categories "cleaning," "electrician," "gardening," "mover," "painter," "plumbing," etc. Each of these narrower, lower level categories can further include their own lower level categories, e.g., the automotive repair category can include "glass repair," "engine repair," "body shop," etc. Based on these tiered groupings of categories, relevant categories can be recommended to the user. For example, if the user has searched for "plumber," it can be determined that "plumber" is a sub-category of the higher level category "home improvement," and all other categories that fall under "home improvement" can be recommended to the user. In certain embodiments, other related categories that are not in the same grouping, but still related to the current service category can be recommended. For example, if a user searches for restaurants, the user may be provided with recommendations for after-dinner activities, even if the after-dinner activities do not fall into the same categorical grouping as the category "restaurants."

In certain embodiments, when a user runs a search for a particular service category, the search results can display category "breadcrumbs" indicative of any higher level categories to which the service category belongs. For example, if a user searches for "plumbing," the service category "plumbing" may belong to the higher level category "home improvement," which itself may belong to the higher level category "services." In this example, the breadcrumbs might be displayed as follows: "Services>Home Improvement>Plumbing."

The search results module 106 can also be configured to provide a list of alternative locations that are nearby (e.g., within a threshold distance or threshold number of geolocations) the location specified in the current search criteria. For example, if a user searches for plumbers in Palo Alto, Calif., the user may be provided with alternative locations nearby Palo Alto, Calif., such as Mountain View, Calif.; San Jose, Calif.; Fremont, Calif., etc. By selecting one of these alternative locations, the user can re-run the search based on the selected alternative location, e.g., search for plumbers in Mountain View, Calif. Certain service categories may be more amenable to a broader geographic search area, whereas other service categories may require a more localized search. For example, if a user is searching for a coffee shop in a particular neighborhood, it may not be particularly useful to recommend a coffee shop in a neighboring city; whereas if a user is searching for a plumber in a particular city, the user may still be interested in plumbers in nearby cities so long as those plumbers also service the user's city. As such, the alternative locations recommended to a user may vary based on the service category specified in the current search, and a location-sensitivity associated with the service category.

In certain embodiments, if a user selects and/or interacts with one of the entity pages shown in the search results, the user may be presented with other entity pages similar to the entity page selected and/or interacted with by the user. For example, if the user interacts with an entity page for a particular car dealership associated with a particular car brand, the user may be presented with entity pages for other car dealerships associated with the same car brand. In certain embodiments, the similar entity page recommendations may be restricted to other entity pages in the same category as the entity page originally selected and/or interacted with.

Figure 2:
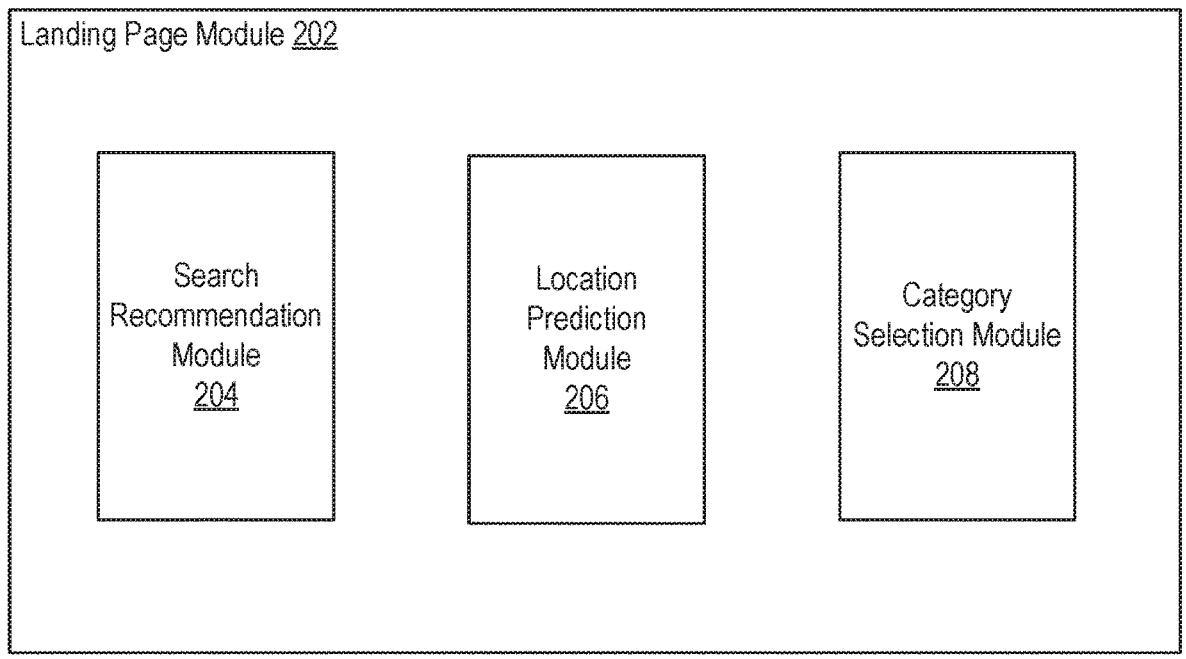
FIG. 2 illustrates an example landing page module, according to various embodiments of the present disclosure.

FIG. 2 illustrates an example landing page module 202 configured to provide a user with a landing page for navigating and/or searching a service directory, according to an embodiment of the present disclosure. In some embodiments, the landing page module 104 of FIG. 1 can be implemented as the landing page module 202. As shown in the example of FIG. 2, the landing page module 202 can include a search recommendation module 204, a location prediction module 206, and a category selection module 208.

The search recommendation module 204 can be configured to predict search terms (e.g., a service category) that may be relevant for a particular user. A model can be trained to predict search terms that may be relevant for a particular user. More details regarding the search recommendation module 204 will be provided with reference to FIG. 3.

The location prediction module 206 can be configured to predict a particular user's location. For example, when a user is presented with a landing page, the landing page can include a search function to search for entity pages. The search function can allow a user to specify a particular location by filing in a location criteria to limit the search to entity pages that are associated with and/or relevant to the location specified by the user. The location prediction module 206 can be configured to predict the user's location, and automatically fill in the location criteria with the predicted location. The user's location can be predicted based on any available information. This can include, for example, a city of residence or hometown specified by the user on a social networking system, a location associated with the user's current IP address, a recent check-in posted to the social networking system by the user, a recent status update posted to the social networking system indicative of a particular location, previous searches performed by the user containing location information, etc. In certain embodiments, the search function can include an image associated with the search function. The image can be selected based on the location predicted by the location prediction module 206. For example, if the location prediction module 206 predicts that a user is located in Seattle, Wash., the image can be an image of the Seattle skyline.

The category selection module 208 can be configured to present a user with one or more service category options for selection by the user. As discussed above, in addition to a search function, the landing page can include one or more service category options that a user can select. Selection of a particular service category option can result in a search being run for the selected service category. A set of service categories can be pre-defined by, for example, a social networking system. In certain embodiments, a subset of service categories can be featured and/or selected for presentation. For example, a set of featured service categories may be presented in a more easily visible way, such as larger icons that have images associated with each featured service category. A subset of featured service categories can be selected based on various featured category selection criteria. For example, service categories can be ranked based on category ranking criteria. The category ranking criteria can include the popularity of the service category (e.g., the frequency with which the service category is selected and/or searched), to name one example. In certain embodiments, ranking of service categories can vary based on a predicted location determined by the location prediction module 206.

For example, service categories can be ranked based on popularity in the predicted location. If the location prediction module 206 predicts that a user is located in Seattle, Wash., the eight most popular service categories for Seattle can be displayed as featured service categories. There may be various groupings of service category options displayed. For example, a subset of ten featured category options can be selected and displayed with large image icons in a first portion of a user interface, and another subset of fifty categories can be selected and displayed textually in another portion of the user interface to give the user additional service category options to select. Alternatively, if it is feasible to display all service category options to a user, then the user may be presented with all service category options defined by the social networking system. For example, featured category options can be presented in a first portion of a user interface, and then a listing of all service category options can be listed in another portion of the user interface.

Figure 3:
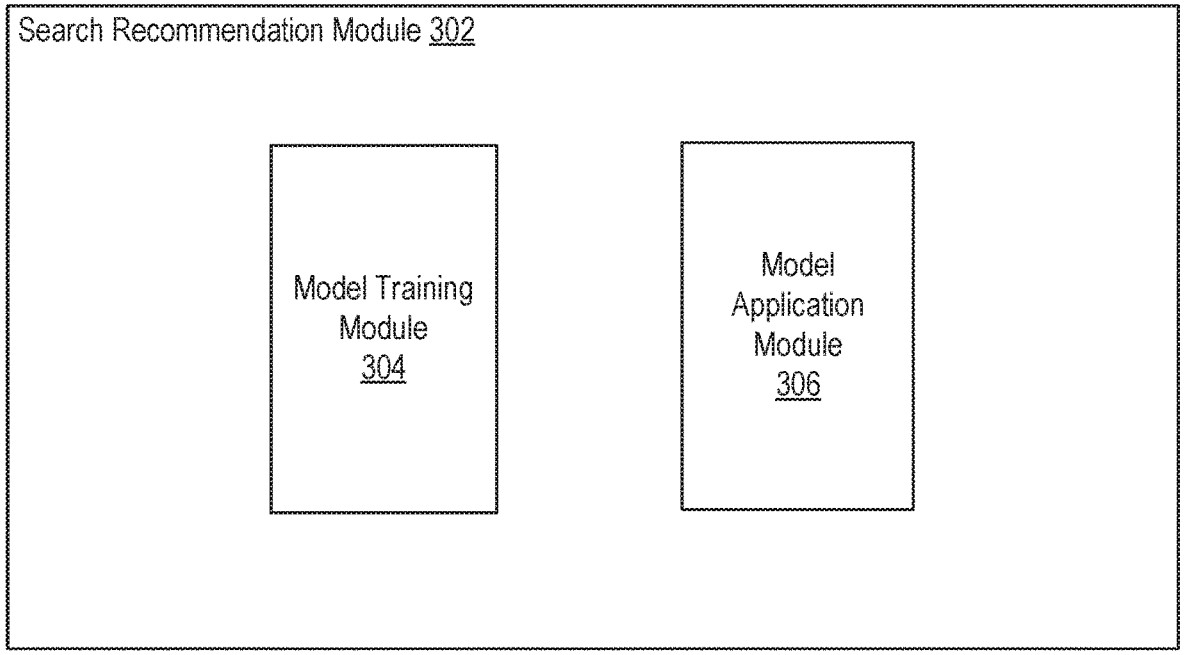
FIG. 3 illustrates an example search recommendation module, according to various embodiments of the present disclosure.

FIG. 3 illustrates an example search recommendation module 302 configured to provide a search recommendation to a user, according to an embodiment of the present disclosure. In some embodiments, the search recommendation module 204 of FIG. 2 can be implemented as the search recommendation module 302. As shown in the example of FIG. 3, the search recommendation module 302 can include a model training module 304 and a model application module 306.

The model training module 304 can be configured to train a machine learning model based on training data. The training data can include historical service directory search information. For example, the training data can include a set of service directory search events, in which users previously ran one or more searches in the service directory. Each search event can include the search terms that were entered by a user, along with additional search prediction information that may be useful in predicting a useful search for a user and/or providing a search recommendation to a user. Search prediction information can include, for example, user identification information (e.g., the user's age, gender, occupation); user social network information (e.g., age, gender, and occupational information of the user's connections on a social networking system); user social networking system engagement information (e.g., entity pages visited by the user over a particular period of time, content posted to the social networking system by the user over a particular period of time); and/or search history information (e.g., previous searches run by the user or the user's connections in the service directory or on other search platforms).

Search prediction information, some examples of which were discussed above, can be provided to the machine learning model so that the machine learning model can be trained to determine which search prediction information is most indicative of and/or associated with particular searches in the service directory. For example, it could be determined that if a user has recently visited the entity page of a plumber, the user is likely to conduct a search on the service directory to look for additional plumbers. Or if a user has recently posted a photograph or status update regarding a pest, the user is likely to search for exterminators in the service directory. Of course, these are simplified examples, and the machine learning model can utilize multiple types or categories of search prediction information in determining the likelihood that a user will search for a particular service category in the service directory.

The model application module 306 can be configured to utilize the machine learning model to predict a service category that may be useful for a particular user in an application or evaluation phase. The predicted service category can then be provided to a user as a search recommendation. For example, when a user opens a service directory (e.g., opens a service directory landing page), search prediction information associated with that user can be received, and provided to the machine learning model. The machine learning model, having been trained with training data, can determine a predictive search recommendation based on the current search prediction information. The predictive search recommendation can be provided to the user. For example, when the user opens the landing page of the service directory, a search box can be pre-filled with a recommended search.

Figure 4A:
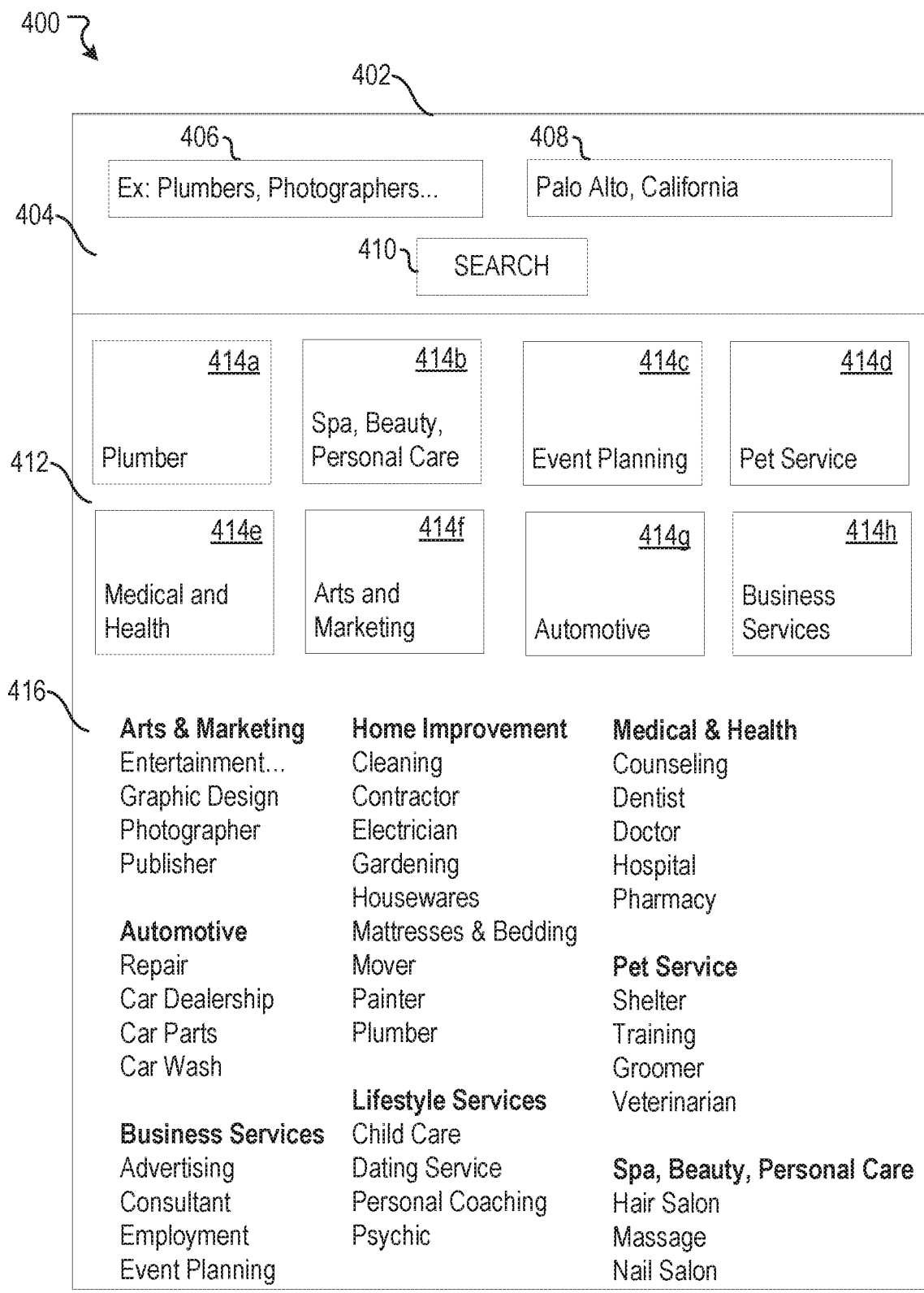
FIG. 4A illustrates an example scenario associated with providing a service directory landing page, according to an embodiment of the present disclosure.

FIG. 4A illustrates an example scenario 400 associated with providing a service directory landing page, according to an embodiment of the present disclosure. The example scenario 400 includes a landing page interface 402. The landing page interface 402 includes a search portion 404, which has a search box 406 for a user to enter search terms, a location box 408 for a user to enter location information, and a search button 410 for a user to run a search. In some cases, the user can be a non-member of a social networking system that provides the service directory landing page, or a member that is not logged into the social networking system. In other cases, the user can be logged into the social networking system. As discussed above, in certain embodiments, the search box 406 can be pre-filled with a search recommendation that has been determined by a machine learning model. The location box 408 can also be pre-filled with location information based on a prediction or determination of a current user's location. In certain embodiments, a background portion of the search portion 404 can include an image associated with the location information stated in the location box 408.

The landing page interface 402 also includes a featured categories portion 412. The featured categories portion 412 includes a subset of categories that have been selected from a larger set of categories based on featured category selection criteria. As discussed above, featured category selection criteria can vary. For example, in the example scenario 400, the featured categories portion 412 includes eight featured categories 414a-414h. These eight featured categories may have been selected based on a ranking of categories according to popularity for the user's location. In this example, the eight most popular categories for users in Palo Alto, Calif. would be displayed. Popularity may be determined based on the number of users who have searched for each category in a predetermined period of time, e.g., the last day, the last week, the last 30 days, or the last year. If a user selects a featured category 414a-414h, a search can be run for entities associated with the selected category. For example, if a user selects the "arts and marketing" category 414f, a search can be run for entities associated with the category "arts and marketing" in Palo Alto, Calif.

Below the featured categories portion 412 is an additional categories portion 416, in which additional categories are listed. The additional categories can include the featured categories 414a-414h, or can exclude them. The additional categories portion 416 may include all service category options available for selection (e.g., all service categories defined by a social networking system), or may include a different subset of service categories. For example, if the featured categories portion 412 represents the top eight service categories based on ranking criteria, the additional categories portion 416 may include the top fifty service categories based on the same or different ranking criteria. The user can select any category within the additional categories portion 416 to run a search for entities associated with that service category.

Figure 4B:
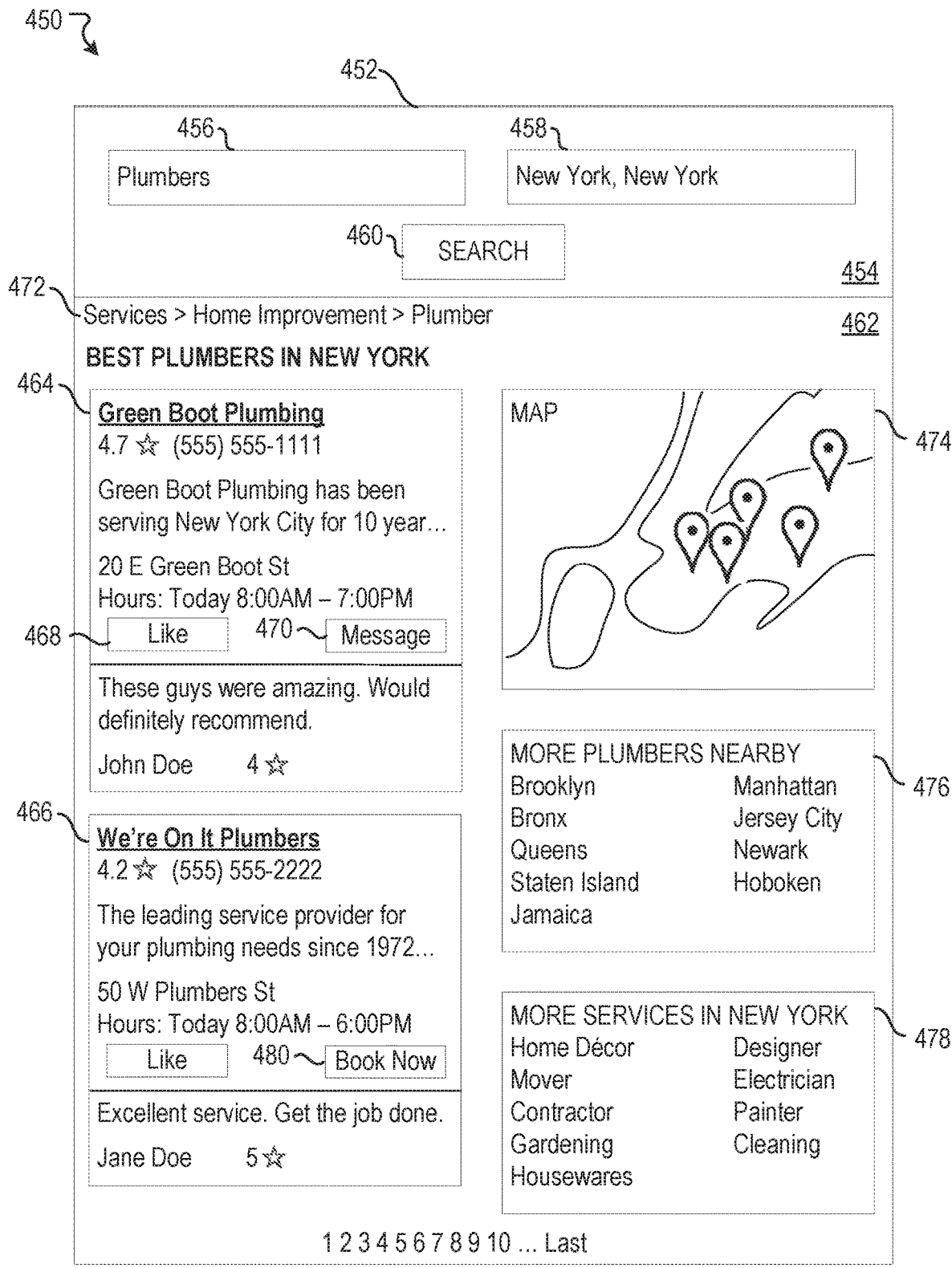
FIG. 4B illustrates an example scenario associated with providing service directory search results, according to an embodiment of the present disclosure.

FIG. 4B illustrates an example scenario 450 associated with providing search results to a user, according to an embodiment of the present disclosure. The example scenario 450 includes a search results interface 452. The search results interface 452 includes a search portion 454, which includes a search box 456 and a location box 458. The search portion can display the search parameters used for the current search. For example, in the example scenario 452, the user has run a search for plumbers in New York, N.Y. The search portion 454 also allows a user to run a new search by entering search parameters into the search box 456 and/or the location box 458 and then selecting a search button 460. In some cases, the user can be a non-member of a social networking system that provides the service directory search results, or a member that is not logged into the social networking system. In other cases, the user can be logged into the social networking system.

The search results interface 452 displays search results for the current search in a search results portion 462. The search results portion 462 includes category breadcrumbs 472 to provide a user with the higher level category groups to which the searched category belongs. In the example scenario 450, the user has searched for the service category "plumbers," which falls under the higher level category "home improvement," which falls under the higher level category "services."

The search results portion 462 also includes search results 464, 466. Each search result 464, 466 is associated with a particular entity page on a social networking system. The first search result 464 is associated with the entity page for the entity "Green Boot Plumbing." The search result 464 includes information about Green Boot Plumbing, such as a rating (4.7 stars), a phone number, an address, business hours, a review of the entity, and a description of the entity. The search result also includes two call to action buttons 468, 470. The first call to action button 468 allows a user to "like" the entity's page on the social networking system, while the second call to action button 470 allows a user to message the social networking system. The second search result 466 also includes a like button, and has a "book now" call to action button 480 that allows a user to schedule an appointment with the entity.

The search results portion 462 includes a map 474. The map 474 includes various pins that identify the locations of the various entities listed in the search results. In the example scenario 450, there are five pins on the map, each representing one entity in the search results list (some of which may not be shown in the figure).

The search results portion 462 also includes additional location recommendations 476. The additional location recommendations 476 can include locations nearby the location used for the current search. This may include, for example, neighboring cities or neighborhoods, or cities in the same metropolitan area or state. The additional location recommendations 476 may be selectable, such that if a user selects one of the additional location recommendations, a new search can be run using the selected location. For example, if the user selects "Newark," a new search can be run for plumbers in Newark, and new search results presented to the user.

The search results portion 462 also includes additional service category recommendations 478. The additional service category recommendations can include additional service categories that are in some way related to the service category in the current search. For example, the additional service category recommendations can include one or more service categories that are grouped into the same higher level category as the currently searched service category. In the example scenario 450, the currently searched service category, "plumbing," falls in the higher level category "home improvement." As such, the additional service category recommendations can include other service categories that fall within the higher level category "home improvement." If the currently searched service category has lower level categories associated with it, the additional service category recommendation can include these lower level categories. For example, if the service category plumber had associated with it lower level categories such as "copper plumbing," "toilet repair," "sink repair," "rain shower installation," these lower level categories could be listed in the additional service category recommendations 478. The additional service category recommendations can be selectable by the user to run a new search using the newly selected service category.

FIG. 5 illustrates an example method 500 associated with providing a service directory predictive search recommendation, according to an embodiment of the present disclosure. It should be appreciated that there can be additional, fewer, or alternative steps performed in similar or alternative orders, or in parallel, within the scope of the various embodiments discussed herein unless otherwise stated.

At block 502, the example method 500 can train a machine learning model to determine predictive search recommendations based on search prediction information, wherein the search prediction information includes at least one of user identification information, user social network information, user social network engagement information, or past search history information. At block 504, the example method 500 can provide search prediction information associated with a user to the machine learning model. At block 506, the example method 500 can present a predictive search recommendation to the user based on the machine learning model and the search prediction information. At block 508, the example method 500 can perform a search based on the predictive search recommendation for one or more search results associated with entity pages on a social networking system. At block 510, the example method 500 can present the one or more search results to the user based on the search, each search result being associated with an entity page on the social networking system.

It is contemplated that there can be many other uses, applications, and/or variations associated with the various embodiments of the present disclosure. For example, in some cases, user can choose whether or not to opt-in to utilize the disclosed technology. The disclosed technology can also ensure that various privacy settings and preferences are maintained and can prevent private information from being divulged. In another example, various embodiments of the present disclosure can learn, improve, and/or be refined over time.

Social Networking System—Example Implementation

Figure 6:
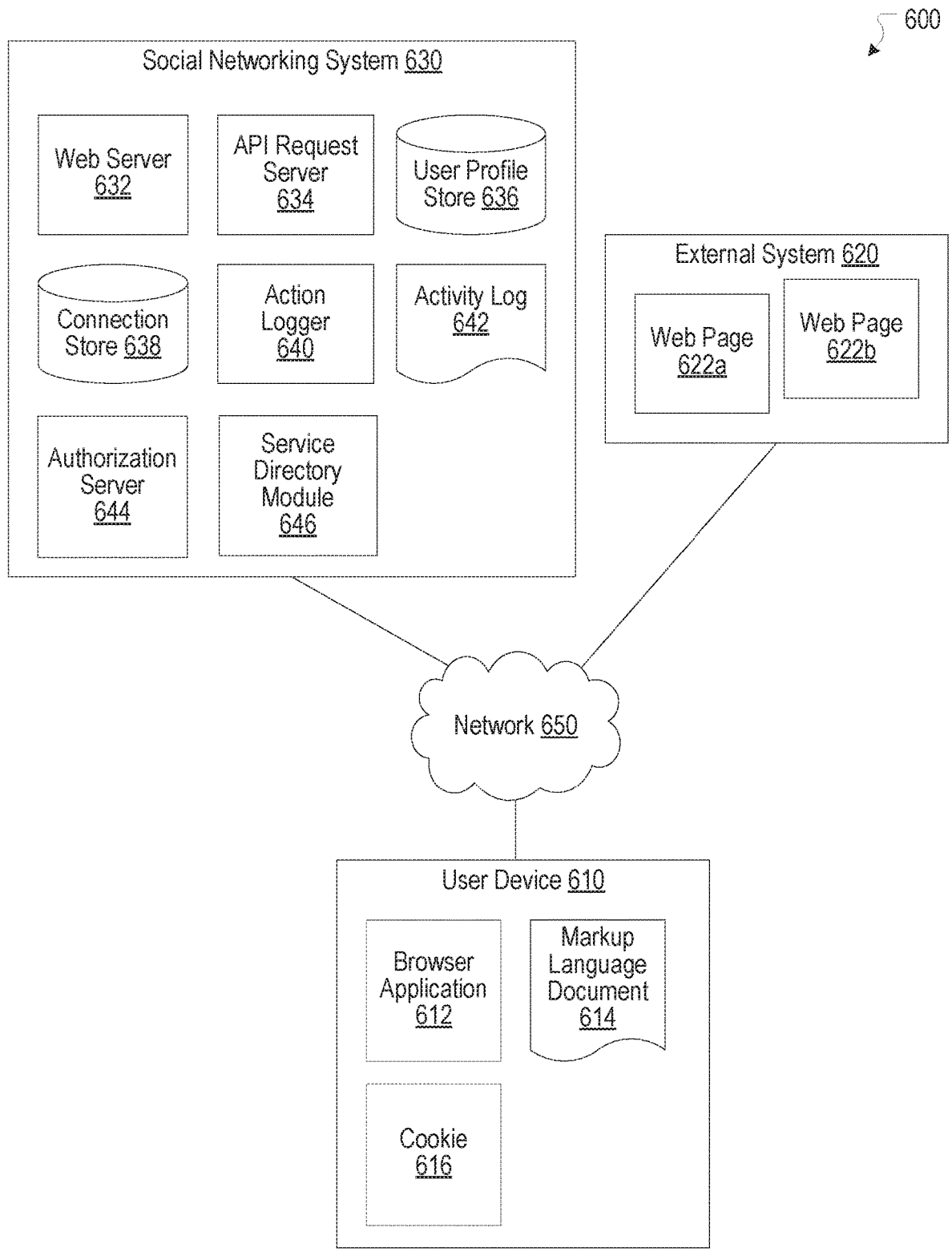
FIG. 6 illustrates a network diagram of an example system including an example social networking system that can be utilized in various scenarios, according to an embodiment of the present disclosure.

FIG. 6 illustrates a network diagram of an example system 600 that can be utilized in various scenarios, according to an embodiment of the present disclosure. The system 600 includes one or more user devices 610, one or more external systems 620, a social networking system (or service) 630, and a network 650. In an embodiment, the social networking service, provider, and/or system discussed in connection with the embodiments described above may be implemented as the social networking system 630. For purposes of illustration, the embodiment of the system 600, shown by FIG. 6, includes a single external system 620 and a single user device 610. However, in other embodiments, the system 600 may include more user devices 610 and/or more external systems 620. In certain embodiments, the social networking system 630 is operated by a social network provider, whereas the external systems 620 are separate from the social networking system 630 in that they may be operated by different entities. In various embodiments, however, the social networking system 630 and the external systems 620 operate in conjunction to provide social networking services to users (or members) of the social networking system 630. In this sense, the social networking system 630 provides a platform or backbone, which other systems, such as external systems 620, may use to provide social networking services and functionalities to users across the Internet.

The user device 610 comprises one or more computing devices that can receive input from a user and transmit and receive data via the network 650. In one embodiment, the user device 610 is a conventional computer system executing, for example, a Microsoft Windows compatible operating system (OS), Apple OS X, and/or a Linux distribution. In another embodiment, the user device 610 can be a device having computer functionality, such as a smart-phone, a tablet, a personal digital assistant (PDA), a mobile telephone, etc. The user device 610 is configured to communicate via the network 650. The user device 610 can execute an application, for example, a browser application that allows a user of the user device 610 to interact with the social networking system 630. In another embodiment, the user device 610 interacts with the social networking system 630 through an application programming interface (API) provided by the native operating system of the user device 610, such as iOS and ANDROID. The user device 610 is configured to communicate with the external system 620 and the social networking system 630 via the network 650, which may comprise any combination of local area and/or wide area networks, using wired and/or wireless communication systems.

In one embodiment, the network 650 uses standard communications technologies and protocols. Thus, the network 650 can include links using technologies such as Ethernet, 802.11, worldwide interoperability for microwave access (WiMAX), 3G, 4G, CDMA, GSM, LTE, digital subscriber line (DSL), etc. Similarly, the networking protocols used on the network 650 can include multiprotocol label switching (MPLS), transmission control protocol/Internet protocol (TCP/IP), User Datagram Protocol (UDP), hypertext transport protocol (HTTP), simple mail transfer protocol (SMTP), file transfer protocol (FTP), and the like. The data exchanged over the network 650 can be represented using technologies and/or formats including hypertext markup language (HTML) and extensible markup language (XML). In addition, all or some links can be encrypted using conventional encryption technologies such as secure sockets layer (SSL), transport layer security (TLS), and Internet Protocol security (IPsec).

In one embodiment, the user device 610 may display content from the external system 620 and/or from the social networking system 630 by processing a markup language document 614 received from the external system 620 and from the social networking system 630 using a browser application 612. The markup language document 614 identifies content and one or more instructions describing formatting or presentation of the content. By executing the instructions included in the markup language document 614, the browser application 612 displays the identified content using the format or presentation described by the markup language document 614. For example, the markup language document 614 includes instructions for generating and displaying a web page having multiple frames that include text and/or image data retrieved from the external system 620 and the social networking system 630. In various embodiments, the markup language document 614 comprises a data file including extensible markup language (XML) data, extensible hypertext markup language (XHTML) data, or other markup language data. Additionally, the markup language document 614 may include JavaScript Object Notation (JSON) data, JSON with padding (JSONP), and JavaScript data to facilitate data-interchange between the external system 620 and the user device 610. The browser application 612 on the user device 610 may use a JavaScript compiler to decode the markup language document 614.

The markup language document 614 may also include, or link to, applications or application frameworks such as FLASH™ or Unity™ applications, the SilverLight™ application framework, etc.

In one embodiment, the user device 610 also includes one or more cookies 616 including data indicating whether a user of the user device 610 is logged into the social networking system 630, which may enable modification of the data communicated from the social networking system 630 to the user device 610.

The external system 620 includes one or more web servers that include one or more web pages 622a, 622b, which are communicated to the user device 610 using the network 650. The external system 620 is separate from the social networking system 630. For example, the external system 620 is associated with a first domain, while the social networking system 630 is associated with a separate social networking domain. Web pages 622a, 622b, included in the external system 620, comprise markup language documents 614 identifying content and including instructions specifying formatting or presentation of the identified content.

The social networking system 630 includes one or more computing devices for a social network, including a plurality of users, and providing users of the social network with the ability to communicate and interact with other users of the social network. In some instances, the social network can be represented by a graph, i.e., a data structure including edges and nodes. Other data structures can also be used to represent the social network, including but not limited to databases, objects, classes, meta elements, files, or any other data structure. The social networking system 630 may be administered, managed, or controlled by an operator. The operator of the social networking system 630 may be a human being, an automated application, or a series of applications for managing content, regulating policies, and collecting usage metrics within the social networking system 630. Any type of operator may be used.

Users may join the social networking system 630 and then add connections to any number of other users of the social networking system 630 to whom they desire to be connected. As used herein, the term "friend" refers to any other user of the social networking system 630 to whom a user has formed a connection, association, or relationship via the social networking system 630. For example, in an embodiment, if users in the social networking system 630 are represented as nodes in the social graph, the term "friend" can refer to an edge formed between and directly connecting two user nodes.

Connections may be added explicitly by a user or may be automatically created by the social networking system 630 based on common characteristics of the users (e.g., users who are alumni of the same educational institution). For example, a first user specifically selects a particular other user to be a friend. Connections in the social networking system 630 are usually in both directions, but need not be, so the terms "user" and "friend" depend on the frame of reference. Connections between users of the social networking system 630 are usually bilateral ("two-way"), or "mutual," but connections may also be unilateral, or "one-way." For example, if Bob and Joe are both users of the social networking system 630 and connected to each other, Bob and Joe are each other's connections. If, on the other hand, Bob wishes to connect to Joe to view data communicated to the social networking system 630 by Joe, but Joe does not wish to form a mutual connection, a unilateral connection may be established. The connection between users may be a direct connection; however, some embodiments of the social networking system 630 allow the connection to be indirect via one or more levels of connections or degrees of separation.

In addition to establishing and maintaining connections between users and allowing interactions between users, the social networking system 630 provides users with the ability to take actions on various types of items supported by the social networking system 630. These items may include groups or networks (i.e., social networks of people, entities, and concepts) to which users of the social networking system 630 may belong, events or calendar entries in which a user might be interested, computer-based applications that a user may use via the social networking system 630, transactions that allow users to buy or sell items via services provided by or through the social networking system 630, and interactions with advertisements that a user may perform on or off the social networking system 630. These are just a few examples of the items upon which a user may act on the social networking system 630, and many others are possible. A user may interact with anything that is capable of being represented in the social networking system 630 or in the external system 620, separate from the social networking system 630, or coupled to the social networking system 630 via the network 650.

The social networking system 630 is also capable of linking a variety of entities. For example, the social networking system 630 enables users to interact with each other as well as external systems 620 or other entities through an API, a web service, or other communication channels. The social networking system 630 generates and maintains the "social graph" comprising a plurality of nodes interconnected by a plurality of edges. Each node in the social graph may represent an entity that can act on another node and/or that can be acted on by another node. The social graph may include various types of nodes. Examples of types of nodes include users, non-person entities, content items, web pages, groups, activities, messages, concepts, and any other things that can be represented by an object in the social networking system 630. An edge between two nodes in the social graph may represent a particular kind of connection, or association, between the two nodes, which may result from node relationships or from an action that was performed by one of the nodes on the other node. In some cases, the edges between nodes can be weighted. The weight of an edge can represent an attribute associated with the edge, such as a strength of the connection or association between nodes. Different types of edges can be provided with different weights. For example, an edge created when one user "likes" another user may be given one weight, while an edge created when a user befriends another user may be given a different weight.

As an example, when a first user identifies a second user as a friend, an edge in the social graph is generated connecting a node representing the first user and a second node representing the second user. As various nodes relate or interact with each other, the social networking system 630 modifies edges connecting the various nodes to reflect the relationships and interactions.

The social networking system 630 also includes user-generated content, which enhances a user's interactions with the social networking system 630. User-generated content may include anything a user can add, upload, send, or "post" to the social networking system 630. For example, a user communicates posts to the social networking system 630 from a user device 610. Posts may include data such as status updates or other textual data, location information, images such as photos, videos, links, music or other similar data and/or media. Content may also be added to the social networking system 630 by a third party. Content "items" are represented as objects in the social networking system 630. In this way, users of the social networking system 630 are encouraged to communicate with each other by posting text and content items of various types of media through various communication channels. Such communication increases the interaction of users with each other and increases the frequency with which users interact with the social networking system 630.

The social networking system 630 includes a web server 632, an API request server 634, a user profile store 636, a connection store 638, an action logger 640, an activity log 642, and an authorization server 644. In an embodiment of the invention, the social networking system 630 may include additional, fewer, or different components for various applications. Other components, such as network interfaces, security mechanisms, load balancers, failover servers, management and network operations consoles, and the like are not shown so as to not obscure the details of the system.

The user profile store 636 maintains information about user accounts, including biographic, demographic, and other types of descriptive information, such as work experience, educational history, hobbies or preferences, location, and the like that has been declared by users or inferred by the social networking system 630. This information is stored in the user profile store 636 such that each user is uniquely identified. The social networking system 630 also stores data describing one or more connections between different users in the connection store 638. The connection information may indicate users who have similar or common work experience, group memberships, hobbies, or educational history. Additionally, the social networking system 630 includes user-defined connections between different users, allowing users to specify their relationships with other users. For example, user-defined connections allow users to generate relationships with other users that parallel the users' real-life relationships, such as friends, co-workers, partners, and so forth. Users may select from predefined types of connections, or define their own connection types as needed. Connections with other nodes in the social networking system 630, such as non-person entities, buckets, cluster centers, images, interests, pages, external systems, concepts, and the like are also stored in the connection store 638.

The social networking system 630 maintains data about objects with which a user may interact. To maintain this data, the user profile store 636 and the connection store 638 store instances of the corresponding type of objects maintained by the social networking system 630. Each object type has information fields that are suitable for storing information appropriate to the type of object. For example, the user profile store 636 contains data structures with fields suitable for describing a user's account and information related to a user's account. When a new object of a particular type is created, the social networking system 630 initializes a new data structure of the corresponding type, assigns a unique object identifier to it, and begins to add data to the object as needed. This might occur, for example, when a user becomes a user of the social networking system 630, the social networking system 630 generates a new instance of a user profile in the user profile store 636, assigns a unique identifier to the user account, and begins to populate the fields of the user account with information provided by the user.

The connection store 638 includes data structures suitable for describing a user's connections to other users, connections to external systems 620 or connections to other entities. The connection store 638 may also associate a connection type with a user's connections, which may be used in conjunction with the user's privacy setting to regulate access to information about the user. In an embodiment of the invention, the user profile store 636 and the connection store 638 may be implemented as a federated database.

Data stored in the connection store 638, the user profile store 636, and the activity log 642 enables the social networking system 630 to generate the social graph that uses nodes to identify various objects and edges connecting nodes to identify relationships between different objects. For example, if a first user establishes a connection with a second user in the social networking system 630, user accounts of the first user and the second user from the user profile store 636 may act as nodes in the social graph. The connection between the first user and the second user stored by the connection store 638 is an edge between the nodes associated with the first user and the second user. Continuing this example, the second user may then send the first user a message within the social networking system 630. The action of sending the message, which may be stored, is another edge between the two nodes in the social graph representing the first user and the second user. Additionally, the message itself may be identified and included in the social graph as another node connected to the nodes representing the first user and the second user.

In another example, a first user may tag a second user in an image that is maintained by the social networking system 630 (or, alternatively, in an image maintained by another system outside of the social networking system 630). The image may itself be represented as a node in the social networking system 630. This tagging action may create edges between the first user and the second user as well as create an edge between each of the users and the image, which is also a node in the social graph. In yet another example, if a user confirms attending an event, the user and the event are nodes obtained from the user profile store 636, where the attendance of the event is an edge between the nodes that may be retrieved from the activity log 642. By generating and maintaining the social graph, the social networking system 630 includes data describing many different types of objects and the interactions and connections among those objects, providing a rich source of socially relevant information.

The web server 632 links the social networking system 630 to one or more user devices 610 and/or one or more external systems 620 via the network 650. The web server 632 serves web pages, as well as other web-related content, such as Java, JavaScript, Flash, XML, and so forth. The web server 632 may include a mail server or other messaging functionality for receiving and routing messages between the social networking system 630 and one or more user devices 610. The messages can be instant messages, queued messages (e.g., email), text and SMS messages, or any other suitable messaging format.

The API request server 634 allows one or more external systems 620 and user devices 610 to call access information from the social networking system 630 by calling one or more API functions. The API request server 634 may also allow external systems 620 to send information to the social networking system 630 by calling APIs. The external system 620, in one embodiment, sends an API request to the social networking system 630 via the network 650, and the API request server 634 receives the API request. The API request server 634 processes the request by calling an API associated with the API request to generate an appropriate response, which the API request server 634 communicates to the external system 620 via the network 650. For example, responsive to an API request, the API request server 634 collects data associated with a user, such as the user's connections that have logged into the external system 620, and communicates the collected data to the external system 620. In another embodiment, the user device 610 communicates with the social networking system 630 via APIs in the same manner as external systems 620.

The action logger 640 is capable of receiving communications from the web server 632 about user actions on and/or off the social networking system 630. The action logger 640 populates the activity log 642 with information about user actions, enabling the social networking system 630 to discover various actions taken by its users within the social networking system 630 and outside of the social networking system 630. Any action that a particular user takes with respect to another node on the social networking system 630 may be associated with each user's account, through information maintained in the activity log 642 or in a similar database or other data repository. Examples of actions taken by a user within the social networking system 630 that are identified and stored may include, for example, adding a connection to another user, sending a message to another user, reading a message from another user, viewing content associated with another user, attending an event posted by another user, posting an image, attempting to post an image, or other actions interacting with another user or another object. When a user takes an action within the social networking system 630, the action is recorded in the activity log 642. In one embodiment, the social networking system 630 maintains the activity log 642 as a database of entries. When an action is taken within the social networking system 630, an entry for the action is added to the activity log 642. The activity log 642 may be referred to as an action log.

Additionally, user actions may be associated with concepts and actions that occur within an entity outside of the social networking system 630, such as an external system 620 that is separate from the social networking system 630. For example, the action logger 640 may receive data describing a user's interaction with an external system 620 from the web server 632. In this example, the external system 620 reports a user's interaction according to structured actions and objects in the social graph.

Other examples of actions where a user interacts with an external system 620 include a user expressing an interest in an external system 620 or another entity, a user posting a comment to the social networking system 630 that discusses an external system 620 or a web page 622*a* within the external system 620, a user posting to the social networking system 630 a Uniform Resource Locator (URL) or other identifier associated with an external system 620, a user attending an event associated with an external system 620, or any other action by a user that is related to an external system 620. Thus, the activity log 642 may include actions describing interactions between a user of the social networking system 630 and an external system 620 that is separate from the social networking system 630.

The authorization server 644 enforces one or more privacy settings of the users of the social networking system 630. A privacy setting of a user determines how particular information associated with a user can be shared. The privacy setting comprises the specification of particular information associated with a user and the specification of the entity or entities with whom the information can be shared. Examples of entities with which information can be shared may include other users, applications, external systems 620, or any entity that can potentially access the information. The information that can be shared by a user comprises user account information, such as profile photos, phone numbers associated with the user, user's connections, actions taken by the user such as adding a connection, changing user profile information, and the like.

The privacy setting specification may be provided at different levels of granularity. For example, the privacy setting may identify specific information to be shared with other users; the privacy setting identifies a work phone number or a specific set of related information, such as, personal information including profile photo, home phone number, and status. Alternatively, the privacy setting may apply to all the information associated with the user. The specification of the set of entities that can access particular information can also be specified at various levels of granularity. Various sets of entities with which information can be shared may include, for example, all friends of the user, all friends of friends, all applications, or all external systems 620. One embodiment allows the specification of the set of entities to comprise an enumeration of entities. For example, the user may provide a list of external systems 620 that are allowed to access certain information. Another embodiment allows the specification to comprise a set of entities along with exceptions that are not allowed to access the information. For example, a user may allow all external systems 620 to access the user's work information, but specify a list of external systems 620 that are not allowed to access the work information. Certain embodiments call the list of exceptions that are not allowed to access certain information a "block list". External systems 620 belonging to a block list specified by a user are blocked from accessing the information specified in the privacy setting. Various combinations of granularity of specification of information, and granularity of specification of entities, with which information is shared are possible. For example, all personal information may be shared with friends whereas all work information may be shared with friends of friends.

The authorization server 644 contains logic to determine if certain information associated with a user can be accessed by a user's friends, external systems 620, and/or other applications and entities. The external system 620 may need authorization from the authorization server 644 to access the user's more private and sensitive information, such as the user's work phone number. Based on the user's privacy settings, the authorization server 644 determines if another user, the external system 620, an application, or another entity is allowed to access information associated with the user, including information about actions taken by the user.

In some embodiments, the social networking system 630 can include a service directory module 646. The service directory module 646 can, for example, be implemented as the service directory module 102, as discussed in more detail herein. As discussed previously, it should be appreciated that there can be many variations or other possibilities. For example, in some embodiments, one or more functionalities of the service directory module 646 can be implemented in the user device 610.

Hardware Implementation

Figure 7:
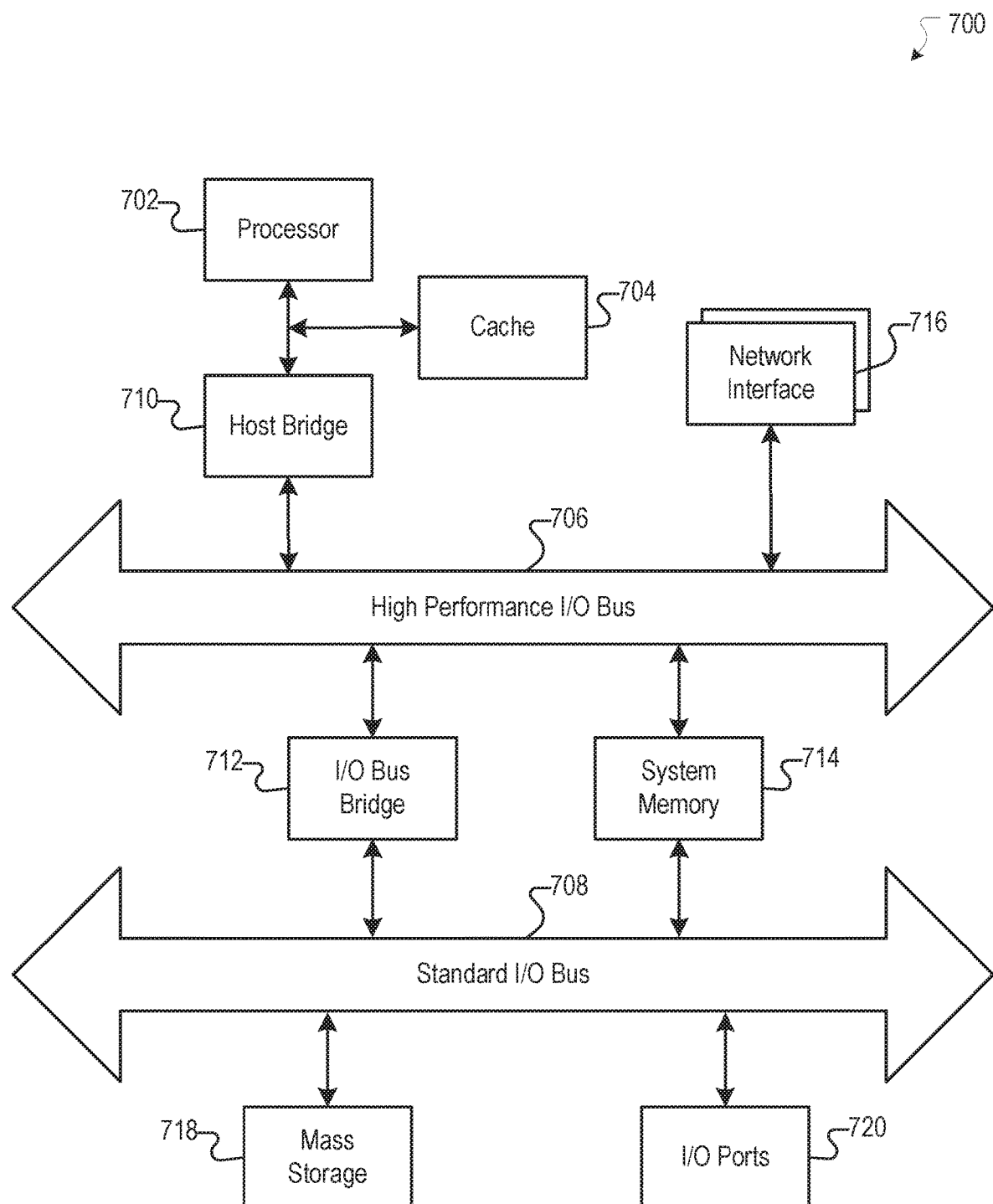
FIG. 7 illustrates an example of a computer system or computing device that can be utilized in various scenarios, according to an embodiment of the present disclosure.

The foregoing processes and features can be implemented by a wide variety of machine and computer system architectures and in a wide variety of network and computing environments. FIG. 7 illustrates an example of a computer system 700 that may be used to implement one or more of the embodiments described herein according to an embodiment of the invention. The computer system 700 includes sets of instructions for causing the computer system 700 to perform the processes and features discussed herein. The computer system 700 may be connected (e.g., networked) to other machines. In a networked deployment, the computer system 700 may operate in the capacity of a server machine or a client machine in a client-server network environment, or as a peer machine in a peer-to-peer (or distributed) network environment. In an embodiment of the invention, the computer system 700 may be the social networking system 630, the user device 610, and the external system 620, or a component thereof. In an embodiment of the invention, the computer system 700 may be one server among many that constitutes all or part of the social networking system 630.

The computer system 700 includes a processor 702, a cache 704, and one or more executable modules and drivers, stored on a computer-readable medium, directed to the processes and features described herein. Additionally, the computer system 700 includes a high performance input/output (I/O) bus 706 and a standard I/O bus 708. A host bridge 710 couples processor 702 to high performance I/O bus 706, whereas I/O bus bridge 712 couples the two buses 706 and 708 to each other. A system memory 714 and one or more network interfaces 716 couple to high performance I/O bus 706. The computer system 700 may further include video memory and a display device coupled to the video memory (not shown). Mass storage 718 and I/O ports 720 couple to the standard I/O bus 708. The computer system 700 may optionally include a keyboard and pointing device, a display device, or other input/output devices (not shown) coupled to the standard I/O bus 708. Collectively, these elements are intended to represent a broad category of computer hardware systems, including but not limited to computer systems based on the x86-compatible processors manufactured by Intel Corporation of Santa Clara, Calif., and the x86-compatible processors manufactured by Advanced Micro Devices (AMD), Inc., of Sunnyvale, Calif., as well as any other suitable processor.

An operating system manages and controls the operation of the computer system 700, including the input and output of data to and from software applications (not shown). The operating system provides an interface between the software applications being executed on the system and the hardware components of the system. Any suitable operating system may be used, such as the LINUX Operating System, the Apple Macintosh Operating System, available from Apple Computer Inc. of Cupertino, Calif., UNIX operating systems, Microsoft® Windows® operating systems, BSD operating systems, and the like. Other implementations are possible.

The elements of the computer system 700 are described in greater detail below. In particular, the network interface 716 provides communication between the computer system 700 and any of a wide range of networks, such as an Ethernet (e.g., IEEE 802.3) network, a backplane, etc. The mass storage 718 provides permanent storage for the data and programming instructions to perform the above-described processes and features implemented by the respective computing systems identified above, whereas the system memory 714 (e.g., DRAM) provides temporary storage for the data and programming instructions when executed by the processor 702. The I/O ports 720 may be one or more serial and/or parallel communication ports that provide communication between additional peripheral devices, which may be coupled to the computer system 700.

The computer system 700 may include a variety of system architectures, and various components of the computer system 700 may be rearranged. For example, the cache 704 may be on-chip with processor 702. Alternatively, the cache 704 and the processor 702 may be packed together as a "processor module", with processor 702 being referred to as the "processor core". Furthermore, certain embodiments of the invention may neither require nor include all of the above components. For example, peripheral devices coupled to the standard I/O bus 708 may couple to the high performance I/O bus 706. In addition, in some embodiments, only a single bus may exist, with the components of the computer system 700 being coupled to the single bus. Moreover, the computer system 700 may include additional components, such as additional processors, storage devices, or memories.

In general, the processes and features described herein may be implemented as part of an operating system or a specific application, component, program, object, module, or series of instructions referred to as "programs". For example, one or more programs may be used to execute specific processes described herein. The programs typically comprise one or more instructions in various memory and storage devices in the computer system 700 that, when read and executed by one or more processors, cause the computer system 700 to perform operations to execute the processes and features described herein. The processes and features described herein may be implemented in software, firmware, hardware (e.g., an application specific integrated circuit), or any combination thereof.

In one implementation, the processes and features described herein are implemented as a series of executable modules run by the computer system 700, individually or collectively in a distributed computing environment. The foregoing modules may be realized by hardware, executable modules stored on a computer-readable medium (or machine-readable medium), or a combination of both. For example, the modules may comprise a plurality or series of instructions to be executed by a processor in a hardware system, such as the processor 702. Initially, the series of instructions may be stored on a storage device, such as the mass storage 718. However, the series of instructions can be stored on any suitable computer readable storage medium. Furthermore, the series of instructions need not be stored locally, and could be received from a remote storage device, such as a server on a network, via the network interface 716. The instructions are copied from the storage device, such as the mass storage 718, into the system memory 714 and then accessed and executed by the processor 702. In various implementations, a module or modules can be executed by a processor or multiple processors in one or multiple locations, such as multiple servers in a parallel processing environment.

Examples of computer-readable media include, but are not limited to, recordable type media such as volatile and non-volatile memory devices; solid state memories; floppy and other removable disks; hard disk drives; magnetic media; optical disks (e.g., Compact Disk Read-Only Memory (CD ROMS), Digital Versatile Disks (DVDs)); other similar non-transitory (or transitory), tangible (or non-tangible) storage medium; or any type of medium suitable for storing, encoding, or carrying a series of instructions for execution by the computer system 700 to perform any one or more of the processes and features described herein.

For purposes of explanation, numerous specific details are set forth in order to provide a thorough understanding of the description. It will be apparent, however, to one skilled in the art that embodiments of the disclosure can be practiced without these specific details. In some instances, modules, structures, processes, features, and devices are shown in block diagram form in order to avoid obscuring the description. In other instances, functional block diagrams and flow diagrams are shown to represent data and logic flows. The components of block diagrams and flow diagrams (e.g., modules, blocks, structures, devices, features, etc.) may be variously combined, separated, removed, reordered, and replaced in a manner other than as expressly described and depicted herein.

Reference in this specification to "one embodiment", "an embodiment", "other embodiments", "one series of embodiments", "some embodiments", "various embodiments", or the like means that a particular feature, design, structure, or characteristic described in connection with the embodiment is included in at least one embodiment of the disclosure. The appearances of, for example, the phrase "in one embodiment" or "in an embodiment" in various places in the specification are not necessarily all referring to the same embodiment, nor are separate or alternative embodiments mutually exclusive of other embodiments. Moreover, whether or not there is express reference to an "embodiment" or the like, various features are described, which may be variously combined and included in some embodiments, but also variously omitted in other embodiments. Similarly, various features are described that may be preferences or requirements for some embodiments, but not other embodiments.

The language used herein has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A computer-implemented method comprising:
   training, by a computing system, a machine learning model to determine predictive search recommendations based on training search terms and training search prediction information associated with the training search terms, wherein the training search prediction information includes training search histories of training users associated with the training search terms and connection search histories of connections of the training users;
   determining, by the computing system, a predicted search term by the machine learning model based on search prediction information associated with a user;
   providing, by the computing system, a landing page that includes a search portion pre-filled with the predicted search term; and
   performing, by the computing system, a search based on the predicted search term for one or more search results associated with entity pages on a social networking system.

2. The computer-implemented method of claim 1, wherein the search prediction information includes at least one of: user identification information, user social network information, user social network engagement information, or past search history information.

3. The computer-implemented method of claim 1, further comprising providing the one or more search results to the user, each search result being associated with an entity page on the social networking system.

4. The computer-implemented method of claim 1, further comprising determining that the user is logged into the social networking system.

5. The computer-implemented method of claim 4, wherein the determining the predicted search term by the machine learning model and the providing the landing page that includes the search portion pre-filled with the predicted search term are performed in response to the determining that the user is logged into the social networking system.

6. The computer-implemented method of claim 1, further comprising ranking the one or more search results based on ranking criteria, wherein
   the search results are provided to the user based on the ranking the one or more search results, and
   the ranking criteria are based on a popularity of each entity page associated with each search result.

7. The computer-implemented method of claim 6, wherein the ranking criteria are further based on interactions between connections of the user on the social networking system with one or more entity pages associated with one or more search results.

8. The computer-implemented method of claim 1, wherein the predicted search term is associated with a service category defined by the social networking system.

9. The computer-implemented method of claim 8, further comprising providing one or more related service categories associated with the service category.

10. The computer-implemented method of claim 9, further comprising:
    receiving a selection of a first related service category of the one or more related service categories;
    performing a second search based on the first related service category.

11. A system comprising:
    at least one processor; and
    a memory storing instructions that, when executed by the at least one processor, cause the system to perform a method comprising:
    training a machine learning model to determine predictive search recommendations based on training search terms and training search prediction information associated with the training search terms, wherein the training search prediction information includes training search histories of training users associated with the training search terms and connection search histories of connections of the training users;
    determining a predicted search term by the machine learning model based on search prediction information associated with a user;

providing a landing page that includes a search portion pre-filled with the predicted search term; and performing a search based on the predicted search term for one or more search results associated with entity pages on a social networking system.

12. The system of claim 11, wherein the search prediction information includes at least one of: user identification information, user social network information, user social network engagement information, or past search history information.

13. The system of claim 11, wherein the method further comprises providing the one or more search results to the user, each search result being associated with an entity page on the social networking system.

14. The system of claim 11, wherein the method further comprises determining that the user is logged into the social networking system.

15. The system of claim 14, wherein the determining the predicted search term by the machine learning model and the providing the landing page that includes the search portions pre-filled with the predicted search term are performed in response to the determining that the user is logged into the social networking system.

16. A non-transitory computer-readable storage medium including instructions that, when executed by at least one processor of a computing system, cause the computing system to perform a method comprising:

training a machine learning model to determine predictive search recommendations based on training search terms and training search prediction information associated with the training search terms, wherein the training search prediction information includes training search histories of training users associated with the training search terms and connection search histories of connections of the training users;

determining a predicted search term by the machine learning model based on search prediction information associated with a user;

providing a landing page that includes a search portion pre-filled with the predicted search term; and performing a search based on the predicted search term for one or more search results associated with entity pages on a social networking system.

17. The non-transitory computer-readable storage medium of claim 16, wherein the search prediction information includes at least one of: user identification information, user social network information, user social network engagement information, or past search history information.

18. The non-transitory computer-readable storage medium of claim 16, wherein the method further comprises providing the one or more search results to the user, each search result being associated with an entity page on the social networking system.

19. The non-transitory computer-readable storage medium of claim 16, wherein the method further comprises determining that the user is logged into the social networking system.

20. The non-transitory computer-readable storage medium of claim 19, wherein the determining the predicted search term by the machine learning model and the providing the landing page that includes the search portion pre-filled with the predicted search term are performed in response to the determining that the user is logged into the social networking system.

* * * * *